July 23, 1957  W. P. WYTHE  2,799,968
MUSIC STAND
Filed Nov. 30, 1955
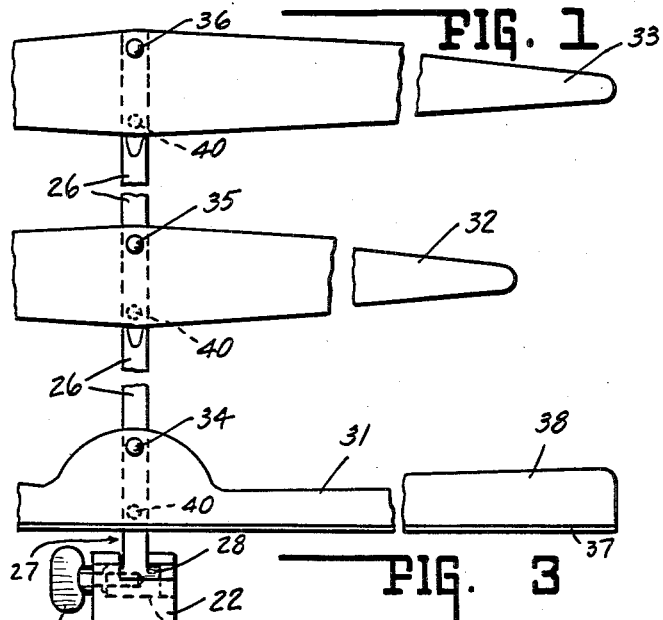
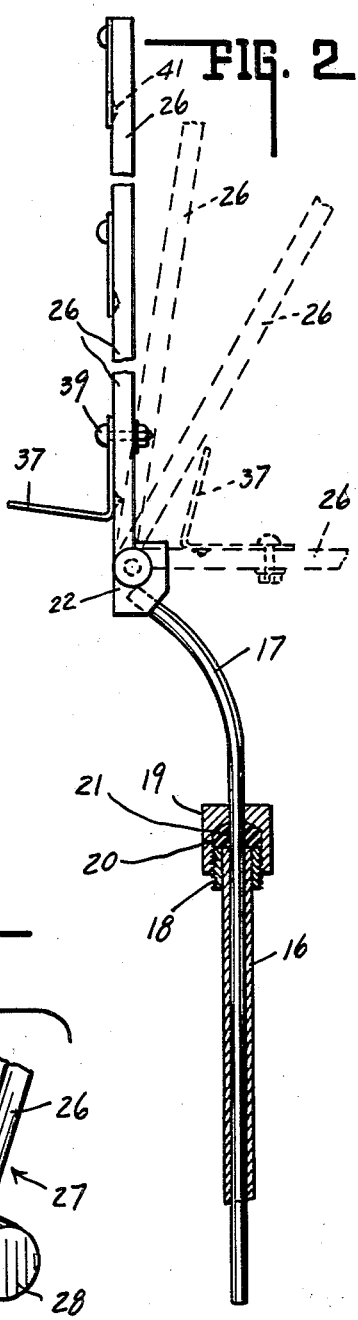
INVENTOR.
WINSTON P. WYTHE.
BY
Lockwood, Galt, Woodard & Smith
ATTORNEYS United States Patent Office 2,799,968
Patented July 23, 1957

2,799,968

MUSIC STAND

Winston P. Wythe, Indianapolis, Ind.

Application November 30, 1955, Serial No. 550,124

2 Claims. (Cl. 45—121)

This invention relates to a music stand construction, and more particularly to a support for musical scores, the rack of which is adjustable to a multiplicity of convenient positions, and which may be disassembled and moved from place to place or stored in compact form, thereby occupying a minimum of space.

Heretofore the conventional music stands have been adjustable only to a very limited extent, if at all, and have frequently been top-heavy as a result of which they have been subjected to being knocked over or blown over as for example when the rack has been used in an open or outside auditorium. Furthermore, such stands have been bulky and relatively heavy, which facts have created problems in connection with their storage and in their transport or movement from place to place. It is the primary object of the present invention to overcome the above disadvantages and to provide a light weight stand wherein the weight of the rack itself is centralized relative to the base thereby making it better adapted to support a musical score or scores without much danger of the entire stand being turned over.

It is a further object of the present invention to provide a stand made up of several different parts which may be readily assembled and disassembled when desired. Thus the storage problem following use is lessened, and it is of course also easier to move the entire unit from place to place in the knock-down condition than where the stand is in but one piece.

It is a still further object of the present invention to provide a stand which is readily adjustable to a multiplicity of positions both height-wise and "angularity-wise." That is to say, it is an object to provide a score supporting rack which may be moved arcuately through a range of 90° or more and readily supported in any of the multiplicity of different angular positions throughout that range.

It is a still further object of the present invention to form a base in such manner that it may be used as a footrest to give the person a place to put his foot and keep the rack from being blown over by the wind when it is being used outdoors.

It is a further object of the present invention to provide a music stand having each and all of the foregoing advantages and characteristics while at the same time preserving an attractive overall appearance.

The full nature of the invention will be understood from the accompanying drawings and the following description and claims:

In the drawings:

Fig. 1 is a front elevation view of the invention with parts broken away and with other parts thereof shown in section.

Fig. 2 is a side elevation view thereof with parts in section and with the base portion omitted.

Fig. 3 is a bottom plan view of a portion of the base with the legs omitted.

Fig. 4 is an exploded perspective view of the joint assembly of the invention which connects the rack portion and the lower support or base portion.

In the drawings the invention is shown to include the legs 10 which are pivotally connected at 11 to the tripod type base 12. A centrally located and threaded bore 13 is formed in the base for reception of the thumb nut 14. The head of this nut engages a flexible disc 15 and urges it into abutment with each of the legs. Thus as the stand is picked up and moved from one point to another on a platform or the like the legs will be retained in the desired position and will not automatically be pivoted downwardly by gravity to a substantially vertical position. Of course, when the stand is to be moved to a remote place or stored it is possible to remove the nut and the disc thereby permitting the legs to pivot downwardly so that their plane is substantially parallel to that of the tubular column 16. This column is suitably secured to the upper face of the base and slidingly receives through the opening at its upper end the curved rod 17.

By relatively moving rod 17 and tubing 16 the desired height adjustment of the stand may be readily effected. In order to retain the assembly in the selected height position an externally threaded sleeve 18 is brazed, welded or otherwise suitably secured to the upper end of the tubing. Mating with this sleeve is an internally threaded knurled nut 19. Interposed between the confronting surfaces of the nut and sleeve is a resilient element 20.

When it is desired to move the rod relative to the tubing the knurled nut is unscrewed or loosened thereby permitting the resilient element to expand to its normal condition wherein the rod may move freely through the aperture 21 in the element. On the other hand, when it is desired to hold the rod in the adjusted position, the nut is tightened thereby compressing the resilient element to such an extent that its aperture is constricted and bears upon the rod with sufficient pressure to retain it in the adjusted position.

Suitably connected to the upper extremity of the rod is an aluminum block 22 or the like (see Fig. 4). A partially cylindrical, open faced slot 23 is formed in the block throughout a portion of its length and an internally threaded bore 24 is formed coaxially with the slot throughout the remaining portion of the block as shown particularly in Fig. 4.

The upper portion of the block is completely cut away at 25 at right angles to the axis of the slot, to receive in tongue-and-slot type relation the arm 26 of the substantially T-shaped member shown generally at 27, having the cylindrical head or tongue 28. The width of the cutaway portion or slot 25 is substantially equal to but slightly greater than the width of the arm 26. By the same token the diameter of the head is substantially equal to but slightly less than that of the slot 23. By reason of the slot 23 being only partially complete, the member 27 and more particularly its head may be laterally associated therewith. Since the slot 23 is formed to an extent greater than 180 degrees as shown it follows that the head cannot be removed therefrom except by relative lateral movement.

The length of the head will be substantially the same but preferably not greater than the length of the slot 23. The head will have formed therein the interiorly threaded bore 29 which will be in alignment and register with the bore 24. Thus when member 27 has been laterally associated with the block until the inner face of the head is in abutment with the adjacent face of the block, the thumb screw 30 may be screwed into position thereby retaining the member in frictional engagement with the block.

The rack portion of the stand comprises a plurality of crossbars 31, 32 and 33 which are preferably formed of aluminum or other light weight material and are pivotally connected at 34, 35 and 36 to the arm 26 of member 27

(see Figs. 1 and 2). As will be observed, the pivot point is adjacent the upper or topmost portion of each crossbar. Thus when desired, each crossbar may be swung or pivoted relative to the arm into a plane substantially parallel to that of the arm.

Each of the crossbars is tapered transversely and the lowermost bar 31, having the music supporting shelf 37, also is characterized by a portion 38 that overlaps the adjacent portion of the crossbar 32 when in disassembled or retracted position (not shown). Since the lowermost crossbar with its shelf 37 supports the musical score or scores it may be preferred to pivotally secure it to the arm or post 26 by the short bolt 39 rather than by a rivet or the like.

In use the stand is assembled so that it is in the condition shown generally in Fig. 1. The thumb nut 14 will have been tightened to cause the flexible disc 15 to hold the legs in an outwardly extending position, and as mentioned, to prevent them from falling by gravity in the event the stand is picked up and moved a short distance. The rod will have been extended through the knurled nut and the resilient element into telescopic association with the tubular member or column. Once the desired height has been selected, the nut can be tightened relative to the sleeve sufficiently to compress the resilient element thereby frictionally holding the rod in the selected position. The upper and rack portion comprising the member 27 and the crossbars will have been laterally associated with the block 22 as described. The wing nut will have been tightened to hold the member in the desired arcuate position. A plurality of such positions is, of course, selectable and some are indicated by dotted lines in Fig. 2. The block 22 and the head 28 of the member 27 form a joint assembly permitting a multiplicity of selective positions of one portion relative to the other, i. e. of the upper portion relative to the lower or base portion.

When it is desired to disassemble the stand the musical score will, of course, first be removed whereupon each of the crossbars may independently be pivoted to a position approaching the plane of the arm 26, i. e. a plane substantially paralleling that plane. In order to so move or pivot the crossbars, sufficient pressure must be exerted to remove the detent 40 from the recess or re-entrant portion 41 of the arm. Such detents, of course, serve to locate and retain each crossbar in the proper position. If further disassembly of the stand is desired the screw 30 may, of course, be completely loosened until the member 27 can be removed from the block. It is also possible to remove the block and its depending curved rod from the tubular column. Thus when desired, the entire stand may be disassembled in such manner as to enable it to be stored or transported with a maximum of ease and in a minimum of space.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A music stand comprising a base portion and a music score rack portion having an arm and crossbars, a joint assembly connecting said portions, said assembly including a tongue formed at right angles at an end of said arm, said tongue having an internally threaded bore, a block formed at an end of said base portion, said block having a partially cylindrical open faced slot formed throughout a part of its length and receiving said tongue, said block also having an internally threaded bore opening into said slot, said last mentioned bore and the bore in said tongue being in alignment, and means insertable in said bores for frictionally connecting said rack portion and said base portion in any selected one of a plurality of relative positions.

2. A music stand comprising a base portion and a music score rack portion having an arm and crossbars, a joint assembly connecting said portions, said assembly including a cylindrical head formed at an end of said arm and having an internally threaded bore, a block formed at an end of said base portion, said block having a partially cylindrical open faced slot formed therein throughout a part of its length and sized for lateral sliding reception of said head, said block including an internally threaded bore formed throughout its remaining length, said last mentioned bore and the bore formed in said head being in alignment, said block also including a slot formed at right angles to the axis of said first mentioned slot and of a width substantialy equal to but slightly greater than the width of said arm, and means inserted in said aligned bores frictionally connecting said head and said block for supporting said respective portions in any one of a multiplicity of relative positions.

References Cited in the file of this patent
UNITED STATES PATENTS

| | | |
|---|---|---|
| 194,698 | Marsh | Aug. 28, 1877 |
| 411,111 | Sibley | Sept. 17, 1889 |
| 564,397 | Stickney | July 21, 1896 |
| 744,386 | Norton | Nov. 17, 1903 |
| 992,908 | Rummel | May 23, 1911 |
| 1,167,383 | Cathcat et al. | Jan. 11, 1916 |
| 2,481,264 | Tulowiecki | Sept. 6, 1949 |
| 2,508,694 | Steed | May 23, 1950 |